Figure 1:
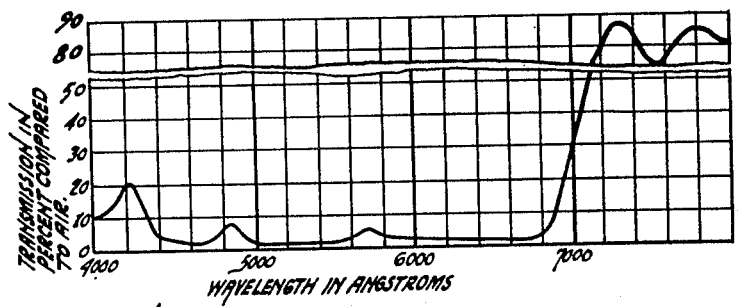

Jan. 6, 1953 — M. E. WIDDOP ET AL — 2,624,238

SELECTIVELY REFLECTING INTERFERENCE MIRRORS

Filed Oct. 29, 1949 — 2 SHEETS—SHEET 1

Inventors
MARY E. WIDDOP AND
GLENN L. DIMMICK

By
Attorney

Jan. 6, 1953 M. E. WIDDOP ET AL 2,624,238
SELECTIVELY REFLECTING INTERFERENCE MIRRORS
Filed Oct. 29, 1949 2 SHEETS—SHEET 2
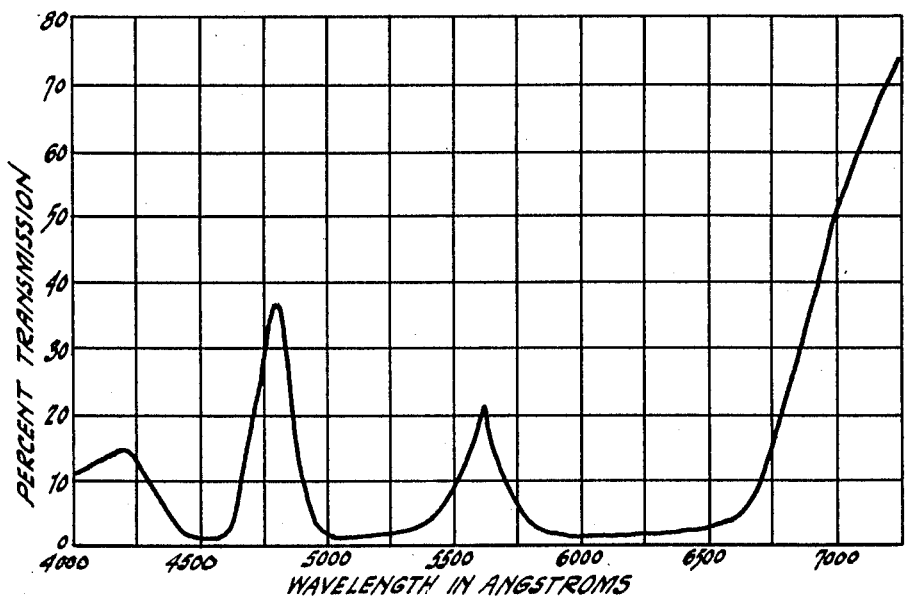
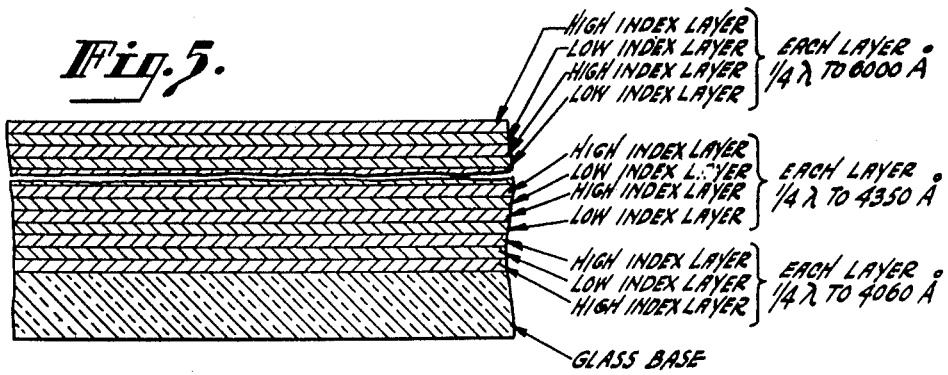
Inventors
MARY E. WIDDOP AND
GLENN L. DIMMICK
Attorney Patented Jan. 6, 1953

2,624,238

UNITED STATES PATENT OFFICE 2,624,238

SELECTIVELY REFLECTING INTERFERENCE MIRRORS

Mary E. Widdop, Oaklyn, and Glenn L. Dimmick, Haddon Heights, N. J., assignors to Radio Corporation of America, a corporation of Delaware Application October 29, 1949, Serial No. 124,268

4 Claims. (Cl. 88—105)

This invention relates generally to improvements in optical devices having the property of reflecting certain wavelengths of radiant energy and transmitting other wavelengths. More particularly, it relates to selectively reflecting devices comprising a transparent glass base upon a surface of which are superimposed a plurality of optically thin interference coating layers, each of which is of the order of thickness of a fractional part of the wavelength of some component of the radiant energy spectrum.

Some ordinary light sources, such as tungsten filament incandescent lamps and carbon-arcs, radiate much heat as well as light. The heat energy which is radiated is mostly in the near infra-red region of the spectrum just outside the visible red band which ends at about 7000 Å.-7600 Å.

The heat energy which is normally radiated by light sources not only results in lowered efficiency of the light source but also presents the problem of removal of the heat in many kinds of apparatus using high intensity sources of light. In high-intensity carbon-arc film projectors, for example, most of the heat reflected by the usual silvered or aluminized focusing mirror behind the light source must be either absorbed or carried away so that it does not destroy the film.

The present invention arose as a result of recognition of the desirability of having an optical device which would reflect high percentages of a broad band of wavelengths throughout the visible spectrum and transmit the long wavelength heat rays in the infra-red region with little or no reflection. In this way, much of the heat radiated from a light source would not need to be transmitted through an optical system before being removed by a cooling device placed inconveniently with respect to the optical components or to the object being illuminated, but could be passed through the focusing mirror to be removed more conveniently by a cooling system placed at the rear of the apparatus.

The present invention provides an improved optical device which effectively solves the problem of reflecting a high percentage of wavelengths throughout the visible portion of the energy spectrum while transmitting most of the energy in the near infra-red region. More broadly, the invention provides a device which may be generally characterized as a color selective mirror comprising a glass base having a surface upon which are deposited a plurality of groups of optically thin interference coatings, each of said groups having maximum reflectivity for light of a substantially different wavelength, and each of said groups being composed of a plurality of layers, alternating members of which are composed of material having an index of refraction which is relatively low compared to that of the glass, and of material having an index of refraction which is relatively high compared to that of the glass, with each of the individual layers having a thickness of about $\frac{1}{4} \lambda$ of light of the color for which the group to which it belongs has maximum reflectivity. The present invention also includes a method of preparing a mirror which is selectively reflective for two or more distinct components of the radiant energy spectrum including the ultra-violet and the near infra-red.

It has previously been known that when white light is reflected from a very thin film of a transparent medium, such as a thin film of oil or water, it is broken up into colors, as in a rainbow. This is due to the fact that part of the light is reflected from the top surface of the oil film and part from the bottom surface. When a specific wavelength of visible light is reflected from the two surfaces so that the reflected beams are in phase, they reinforce each other, and that color will be seen by reflection. Wavelengths which are much longer or shorter will not come out in phase and will tend to cancel each other, this cancellation being complete if the reflected beams are exactly 180° out of phase and of equal intensity. Selective reflectors have previously been made which utilize this principle. Alternate layers of transparent materials of high and low index of refraction have been deposited on a glass surface. The thickness and index of refraction of the deposited layers have been controlled so as to produce constructive interference for the wavelength for which high reflection is desired. An example of a description of devices of this nature can be found in United States Patent 2,412,496 to Glenn L. Dimmick. The devices described in this patent were made by depositing alternate layers of high and low index material, with the high index layers being $\frac{1}{2}$ wavelength in thickness and the low index layers being $\frac{1}{4}$ wavelength in thickness. In these prior art devices, for the most part, optical elements have been made which are selectively reflective such that there has been maximum reflection of only one particular wavelength or band of wavelengths. Although previous devices have also been constructed in which a broad band of wavelengths has been reflected, the average percentage of reflection has not been particularly high over the broad band.

One object of the present invention is to provide an improved optical device for selectively reflecting a high percentage of incident light including two or more distinct components of the visible portion of the radiant energy spectrum.

Another object of the invention is to provide an improved method of preparing an optical device for selectively reflecting two or more fairly widely separated wavelengths or wave bands of the radiant energy spectrum.

Another object of the invention is to provide an improved optical device for reflecting some portions of the radiant energy spectrum substantially completely and transmitting other portions.

Another object of the invention is to provide an improved optical device for reflecting light and transmitting heat.

Another object of the invention is to provide an improved heat transmitting mirror.

Figure 2:
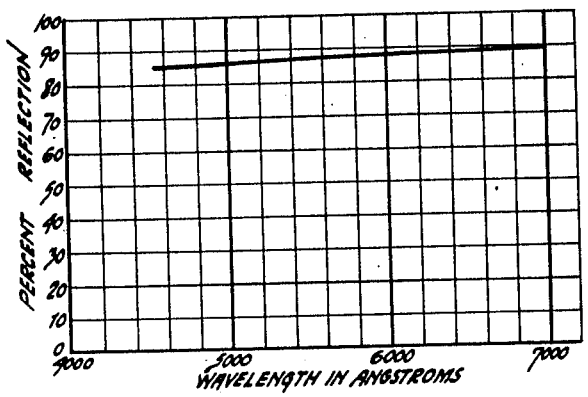
Figure 3:
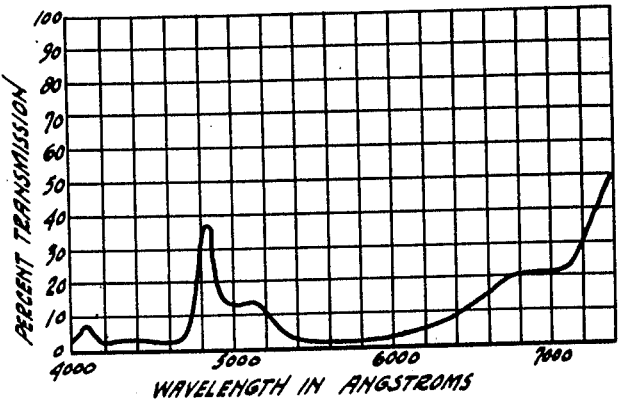

These and other objects will be more apparent and the invention will be more readily understood from the following description, including the drawings of which, Figure 1 is a graph including a curve showing percent transmission of wavelengths of energy throughout the visible and near infra-red portions of the radiant energy spectrum of a preferred embodiment of a device constructed in accordance with the present invention, the incident energy being normal to the surface of the device, Figure 2 is a graph including a curve of percent reflection of wavelength of energy throughout the visible and near infra-red portions of the radiant energy spectrum of a typical silvered mirror, Figure 3 is a graph similar to that of Figure 1 and including a curve of percent transmission of wavelengths of energy throughout the visible and near infra-red portions of the radiant energy spectrum of another embodiment of a device constructed in accordance with the present invention, Figure 4 is a graph similar to that of Figures 2 or 3 for still another embodiment of a device constructed in accordance with the present invention, and Figure 5 is a partial cross section view of an optical device constructed in accordance with the present invention.

The improved optical devices, in accordance with the present invention, are made by carefully cleaning a surface of a glass plate, placing the glass plate with clean surface downward on a supporting member within a vacuum chamber, evacuating the chamber to high vacuum, and then depositing on this surface a plurality of layers of material evaporated from holders positioned beneath the cleaned surface of the glass plate. An example of apparatus which may be used to deposit coatings and make the devices of the present ivnention is more completely described in United States Patent 2,482,329 to Glenn L. Dimmick. As is well known in this art, the degree of vacuum should be $10^{-3}$ mm. of mercury or better. This patent discloses an evaporation apparatus particularly useful in carrying out the objects of the present invention. The apparatus comprises a rotatable turret having a number of cups into which the coating material may be placed, with means for rotating the turret and bringing the cups one after another into position for depositing successive layers of coating material without breaking the vacuum within the vacuum chamber.

There will now be described a preferred example of an optical device which has proved highly efficient in reflecting visible components of the radiant energy spectrum and in transmitting heat energy in the near infra-red region. The device of this example was constructed by applying a succession of 23 separate coating layers on the surface of a glass plate having an index of refraction of about 1.515. The coating materials used in these layers were of two different kinds. One of the materials was zinc sulphide, which has a relatively high index of refraction compared to that of the glass base. Its refractive index is about 2.2. The other material was thorium oxyfluoride, which has an index of refraction of about 1.45, which is relatively low compared to that of the glass. The 23 coating layers were deposited in 6 groups, the first group of which had 3 layers and the remainder of which each had 4 layers. Each group was deposited so as to have maximum reflection for light of a particular wavelength in the visible spectrum, each of these wavelengths being separated by about 300 to 500 Å. Each individual layer had a thickness of about ¼ wavelength of the light for which its group was caused to have maximum reflection. The thickness of each layer was controlled substantially in the manner described in the United States Patent 2,338,234 to Glenn L. Dimmick. In this method, the material is evaporated and deposited on the glass plate while a beam of light from a source outside the vacuum chamber is directed to the other side of the plate being coated. In this case, the angle of incidence of the control beam was 20° from the perpendicular. Light reflected from the glass plate was directed to a photomultiplier cell having a milliammeter in its output circuit. A filter having maximum transition of a particular wavelength for which the coatings being deposited are to be given maximum reflectivity was placed before the photomultiplier cell.

The actual operation of the method is carried out as follows. A reading on the milliammeter in the output circuit of the photomultiplier is first taken by permitting light from the light source to reflect from the uncoated surface of the glass plate and impinge on the photosensitive electrode of the photomultiplier. This reading is arbitrarily designated 100 percent reflection. Then the deposition of the successive films is begun. When the material being deposited is of the high index of refraction variety, reflectivity of the film gradually increases to a maximum. As this maximum is approached, light reflected to the photomultiplier gradually increases and the current reading on the milliammeter rises in a corresponding manner. When the maximum reading on the milliammeter is observed, and just as the current reading begins to decrease, evaporation is stopped. At the point of maximum reading, there will have been deposited substantially a ¼ wavelength thick film of the material; that is, substantially ¼ wavelength with respect to the wavelength of light for which the filter in front of the photocell has maximum transmission. In a similar manner, material of low index of refraction is next deposited on the plate, but this time reflection decreases to a minimum and the evaporation is stopped when the reading on the milliammeter is just passing through the minimum point and is beginning to rise again. The amount of reflection for each individual layer is designated in percent relative to the original reading on the meter. Each time the color filter is changed in front of the photomultiplier, the meter is reset at some convenient figure which may be designated numerically as a certain percentage of the original reading from the uncoated glass. The meter may be reset each time by varying the voltage on the photocell and by adjusting the zero on the meter. In Table I below are listed the 23 coatings in their order of deposition, together with the data observed by reading the meter.

Table I

| Material | Reflection controlled to— | Percent of Reflection | Transmission Peak of Control Filter | Angle of Incidence of Control Beam |
|---|---|---|---|---|
| | | | Angstroms | Degrees |
| Glass | one surface uncoated. | 100 | | |
| ZnS | to maximum | 700 | 4,060 | 20 |
| ThOF₂ | to minimum | 220 | | |
| ZnS | to maximum | 750 | | |
| Control filter changed and meter reset at. | | 500 | | |
| ThOF₂ | to minimum | 200 | 4,350 | 20 |
| ZnS | to maximum | 850 | | |
| ThOF₂ | to minimum | 550 | | |
| ZnS | to maximum | 900 | | |
| Control filter changed and meter reset at. | | 500 | | |
| ThOF₂ | to minimum | 290 | 4,700 | 20 |
| ZnS | to maximum | 550 | | |
| ThOF₂ | to minimum | 370 | | |
| ZnS | to maximum | 550 | | |
| Control filter changed and meter reset at. | | 500 | | |
| ThOF₂ | to minimum | 330 | 5,100 | 20 |
| ZnS | to maximum | 590 | | |
| ThOF₂ | to minimum | 400 | | |
| ZnS | to maximum | 600 | | |
| Control filter changed and meter reset at. | | 500 | | |
| ThOF₂ | to minimum | 150 | 5,500 | 20 |
| ZnS | to maximum | 590 | | |
| ThOF₂ | to minimum | 350 | | |
| ZnS | to maximum | 550 | | |
| Control filter changed and meter reset at. | | 500 | | |
| ThOF₂ | to minimum | 230 | 6,000 | 20 |
| ZnS | to maximum | 530 | | |
| ThOF₂ | to minimum | 330 | | |
| ZnS | to maximum | 500 | | |

The optical device, having the series of coatings decribed in the above table was placed in a spectrophotometer and its percent transmission was measured for wavelengths throughout the entire visible portion of the spectrum between 4,000 and 7,600 Å., and into the near infra-red to about 8,000 A. The transmission curve obtained is shown in Figure 1. The data shown in this figure indicate that the amount of light transmitted between 4,400 A. and 6,800 A. was less than 10 percent and, for most wavelengths, was only about 2 percent. Since, in a device of this sort, almost no light is absorbed, the percent of light reflected at each wavelength can be obtained by subtracting the percent transmitted from 100. Thus, it will be apparent that the percent of light reflected at substantially all wavelengths throughout the visible wavelengths of the spectrum is remarkably high.

The light reflected by even the best of silvered or aluminized mirrors is always less than 100 percent since some absorption naturally occurs. A typical curve of percent reflection of various wavelengths of light in the visible portion of the spectrum between 4,000 A. and 7,000 A. for an ordinary silvered mirror is shown in Figure 2. A comparison of the two curves indicates that the reflection from the mirror of the present invention is a little higher than that from a silvered mirror. Measurements made, comparing the intensity of the reflected beams from the two mirrors, showed that about 5 percent more light was reflected by the mirror of the present invention than by the silvered mirror. A Weston light meter with a visually-corrected cell and an incandescent projection lamp were used for these measurements.

Measurement of the comparative heat reflecting characteristics of the two mirrors was made by placing an iron-constantan thermocouple in the reflected beam. The temperature of the thermocouple was read with no light reflected on it. Without changing the position of the thermocouple, each mirror was placed in a mount positioned to reflect light on the thermocouple. Temperature readings were made for each mirror. A series of readings was made for each light source to correct for possible variation in the intensity of the source. Measurements were made, using a 750-watt, 120-volt, 16 mm. biplan projector lamp. The increase of temperature, due to reflection from the interference mirror, was about 25 percent as great as for the silvered mirror. Using a 4.5-amp., 16 mm. arc lamp, the temperature rise from the interference mirror was about 35 percent as great as with the silvered mirror. The reflection from the interference mirror raised the temperature of the thermocouple about half as much as the reflection from a silvered mirror when a special high-intensity, carbon-arc was used.

Since most of the heat radiated by these light sources is due to the radiation of wavelengths at the edge of the visible red and in the near infrared region, just beyond about 7,000 Å., these measurements indicate that the selectively reflective mirror of the present invention transmits most of the long wavelength heat energy.

In order to get optimum results, the series of coatings described in the above example and listed in Table I is preferred. Less satisfactory results can be obtained by omitting the last two layers of coatings in each of the 6 groups but, in this case, the band of wavelengths reflected by each group of coatings will be narrower and higher transmission peaks will appear in the curve of Figure 1. The overall percentage of light reflected from the device will also decrease so that the device will be considerably less efficient.

An example of an optical device made in accordance with the principles of the present invention but utilizing a smaller number of coating layers than that of Table I will now be described.

Again using alternate layers of zinc sulfide and thorium oxyfluoride, a succession of 19 layers of material was deposited on a clean surface of a glass plate by the method previously described. The order of deposition of the layers is given in Table II, below:

Table II

| Material | Reflection controlled to— | Percent of Reflection | Transmission Peak of Control Filter | Angle of Incidence of Control Beam |
|---|---|---|---|---|
| | | | Angstroms | Degrees |
| Glass | one surface uncoated. | 100 | | |
| ZnS | to maximum | 750 | 4,060 | 20 |
| ThOF₂ | to minimum | 250 | | |
| ZnS | to maximum | 1,200 | | |
| Control filter changed and meter reset at. | | 500 | | |
| ThOF₂ | to minimum | 230 | 4,350 | 20 |
| ZnS | to maximum | 530 | | |
| ThOF₂ | to minimum | 380 | | |
| ZnS | to maximum | 480 | | |
| Control filter changed and meter reset at. | | 500 | | |
| ThOF₂ | to minimum | 420 | 4,700 | 20 |
| ZnS | to maximum | 480 | | |
| Control filter changed and meter reset at. | | 500 | | |
| ThOF₂ | to minimum | 280 | 5,100 | 20 |
| ZnS | to maximum | 470 | | |
| Control filter changed and meter reset at. | | 500 | | |
| ThOF₂ | to minimum | 300 | 5,500 | 20 |
| ZnS | to maximum | 570 | | |
| ThOF₂ | to minimum | 470 | | |
| ZnS | to maximum | 600 | | |
| Control filter changed and meter reset at. | | 500 | | |
| ThOF₂ | to minimum | 320 | 6,000 | 20 |
| ZnS | to maximum | 550 | | |
| ThOF₂ | to minimum | 440 | | |
| ZnS | to maximum | 610 | | |

The curve of percent transmission for wavelengths between 4,000 Å. and 7,200 Å. for the optical element prepared with the succession of coating layers given in Table II is shown in Figure 3. It will be noted that with the exception of a rather high transmission peak at 4,800 Å., this element also exhibits satisfactory reflection characteristics over a broad band of wavelengths in the visible spectrum, although not quite as good as that of the first example.

It will be noted that, in the examples of which both Tables I and II are respectively parts, each group of coatings was made selectively reflective for a wavelength succesively higher than that of the preceding group. Many experiments have also been carried out in which this regular ascending order was not adhered to. As an example, a group of coatings having selective reflection for a wavelength of 6,350 Å. was deposited before a group selectively reflective for 5,500 Å. The example containing such a series of coatings is shown in Table III which follows. In this series of coatings, the low index material was cryolite and the high index material was zinc sulfide.

*Table III*

| Material | Reflection controlled to— | Percent of Reflection | Transmission Peak of Control Filter | Angle of Incidence of Control Beam |
|---|---|---|---|---|
| | | | Angstroms | Degrees |
| Glass | one surface uncoated | 100 | | |
| ZnS | to maximum | 790 | | |
| Cryolite | to minimum | 340 | 4,400 | 15 |
| ZnS | to maximum | 1,400 | | |
| Cryolite | to minimum | 1,150 | | |
| ZnS | to maximum | 1,780 | | |
| Control filter changed and reset at. | | 100 | | |
| Cryolite | to maximum | 250 | | |
| Cryolite | to minimum | 100 | | |
| ZnS | to maximum | 600 | 6,350 | 15 |
| Cryolite | to minimum | 400 | | |
| ZnS | to maximum | 990 | | |
| Cryolite | to minimum | 860 | | |
| ZnS | to maximum | 1,040 | | |
| Control filter changed and reset at. | | 100 | | |
| Cryolite | to minimum | 64 | | |
| ZnS | to maximum | 180 | 5,500 | 15 |
| Cryolite | to minimum | 145 | | |
| ZnS | to maximum | 225 | | |

The percentage transmission curve for wavelengths between 4,000 Å. and 7,200 Å. is shown in Figure 4. It will be noted that the optical element of this example is less satisfactory than that of Example I or that of Example II since these are two transmission peaks.

The mirror had good heat transmission qualities, however, and was found to transmit about 80% of the heat energy incident upon it from an incandescent light source.

An optical device, such as described in any of the above examples, is illustrated in Figure 5. This figure is a partial cross-section view of a device comprising a glass plate upon one surface of which there have been deposited a plurality of groups of coatings of alternately high index and low index material, each group being made selectively reflective to light of a substantially different wavelength. Although each group may consist of only two coating layers, it is preferred to use four layers per group. A higher even number of layers, such as six, or more, may be used as in the third example, but this does not appear to result in further significant improvement.

Six groups of coatings, the groups being selectively reflective for wavelengths regularly spaced throughout the visible waveband, have been found to accomplish the objects of the invention most efficiently. However, as shown by the third example, the number of groups may be less with some sacrifice of efficiency in reflection. Devices using fewer groups of coatings are entirely satisfactory for some purposes. Sometimes it is merely desired to reflect two or more colors efficiently without regard to transmission of heat or reflection of the other colors of the visible spectrum. In this case, fewer groups of coatings may be used, each group being made selectively reflective for a particular peak wavelength which it is desired to reflect.

Various materials, other than zinc sulfide, can be used in the high index layers. Two of these are titanium dioxide and magnesium oxide. Similarly, materials other than thorium oxyfluoride or cryolite may be used in the low index layers, although these two are preferred. Other usable low index materials are calcium fluoride or magnesium fluoride.

There has thus been described a method of making an optical device which reflects two or more distinct color components of the visible spectrum and transmits other visible components and also transmits long wavelength heat energy. The improved device resulting from carrying out the method has also been described and the properties of several examples of the device have been given.

We claim as our invention:

1. An optical device comprising a glass base having a certain index of refraction, said base having a surface carrying at least three superimposed groups of optically thin interference coating layers, each of said groups being selectively reflective of light of different wavelength bands having peaks spaced at least 300 Å. apart throughout the visible spectrum, each group being composed of at least two layers of different coating materials, each layer having a thickness of about ¼ of that peak wavelength to which its group is selectively reflective, alternate ones of said layers being composed of material having an index of refraction which is relatively high compared to that of said base and of material having an index of refraction which is relatively low compared to that of said base, and all of said groups of layers cooperating to reflect substantially all wavelengths in the visible portion of the spectrum while transmitting a high proportion of infra-red.

2. A device according to claim 1 including at least six of said groups and in which at least half of said groups are composed of at least 4 coating layers.

3. A device according to claim 1 in which said glass has an index of refraction of about 1.515, said high index is about 2.2, and said low index is about 1.45.

4. A device according to claim 3 in which said high index material is zinc sulfide and said low index material is thorium oxyfluoride.

MARY E. WIDDOP.
GLENN L. DIMMICK.

(References on following page)

REFERENCES CITED

The following references are of record in the file of this patent:

UNITED STATES PATENTS

| Number | Name | Date |
|---|---|---|
| 2,392,978 | Dimmick | Jan. 15, 1946 |
| 2,399,860 | Dimmick | May 7, 1946 |
| 2,412,496 | Dimmick | Dec. 10, 1946 |
| 2,418,627 | Dimmick | Apr. 8, 1947 |
| 2,519,546 | Colbert et al. | Aug. 22, 1950 |